Figure 1:
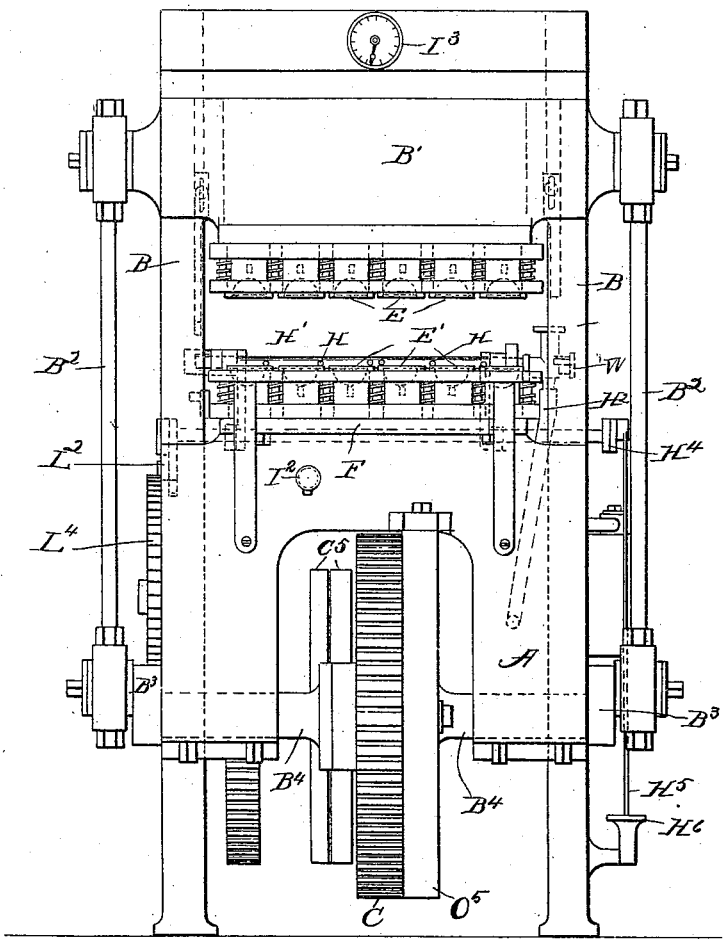

(No Model.) 5 Sheets—Sheet 1.

H. G. WOLCOTT.
PROCESS OF AND MACHINE FOR MAKING HOLLOW SOFT RUBBER ARTICLES.

No. 551,741. Patented Dec. 17, 1895.

Witnesses:
Inventor
Henry G. Wolcott
By Church & Church
his Attorneys

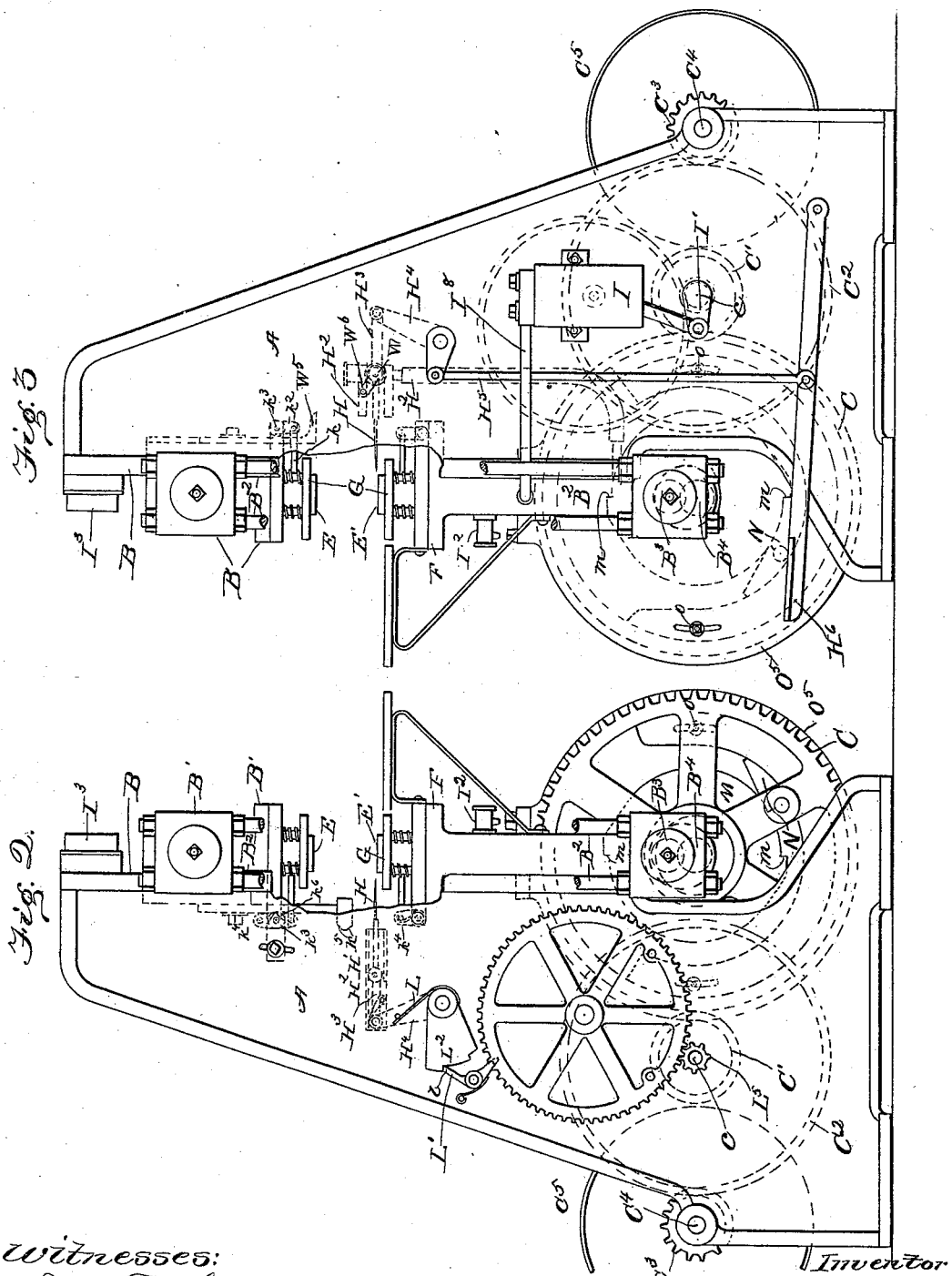

(No Model.) 5 Sheets—Sheet 3.
H. G. WOLCOTT.
PROCESS OF AND MACHINE FOR MAKING HOLLOW SOFT RUBBER ARTICLES.
No. 551,741. Patented Dec. 17, 1895.
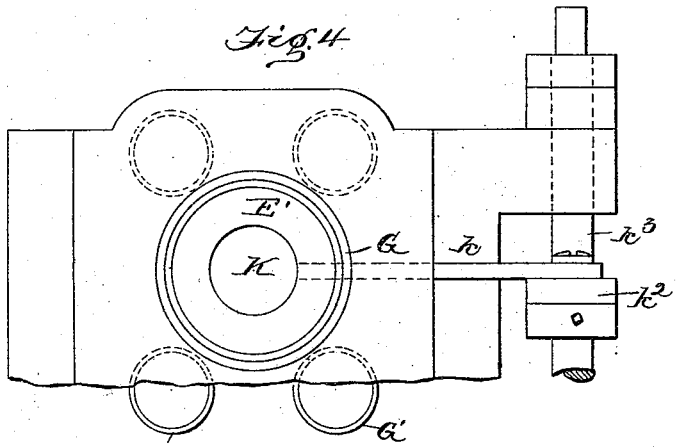
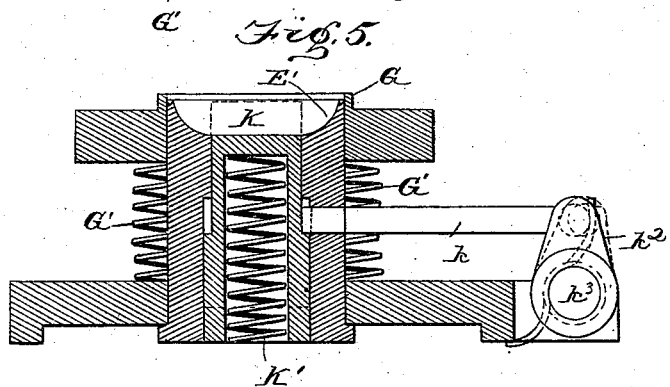
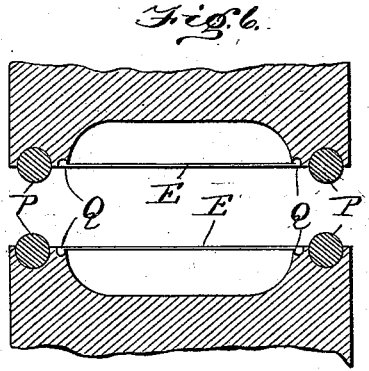
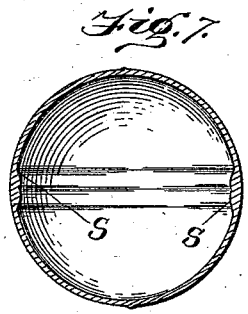
Witnesses:
J. M. Fowler Jr
Alex J. Stewart
Inventor:
Henry G. Wolcott
By Church & Church
his Attorneys.

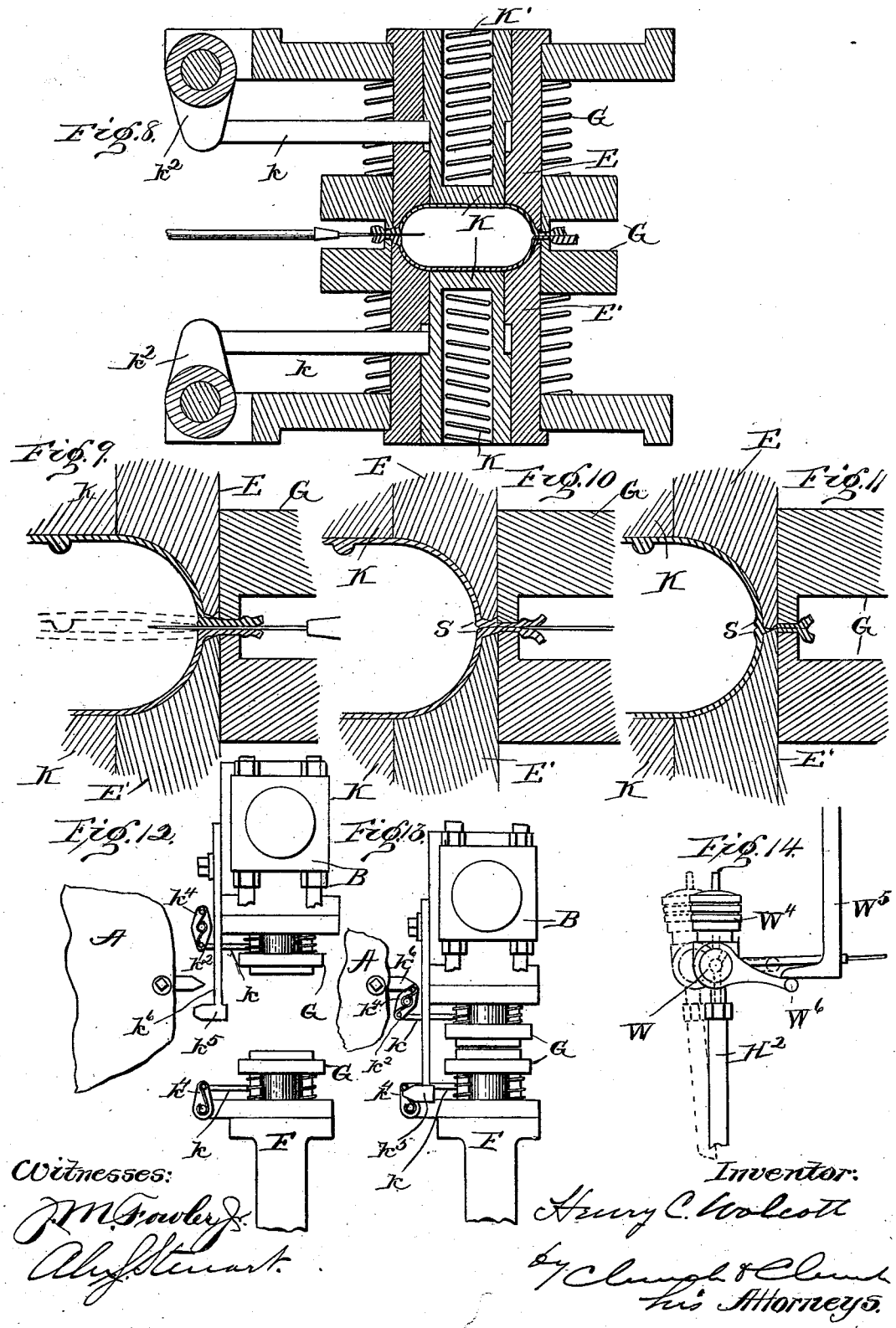

(No Model.) 5 Sheets—Sheet 5.

H. G. WOLCOTT.
PROCESS OF AND MACHINE FOR MAKING HOLLOW SOFT RUBBER ARTICLES.

No. 551,741. Patented Dec. 17, 1895.

UNITED STATES PATENT OFFICE.

HENRY G. WOLCOTT, OF FISHKILL-ON-THE-HUDSON, ASSIGNOR OF ONE-HALF TO JOHN P. RIDER, OF FISHKILL LANDING, NEW YORK.

PROCESS OF AND MACHINE FOR MAKING HOLLOW SOFT-RUBBER ARTICLES.

SPECIFICATION forming part of Letters Patent No. 551,741, dated December 17, 1895.

Application filed July 13, 1895. Serial No. 555,902. (No model.)

*To all whom it may concern:*

Be it known that I, HENRY G. WOLCOTT, of Fishkill-on-the-Hudson, in the county of Dutchess and State of New York, have invented certain new and useful Improvements in Processes of and Machines for Making Hollow Soft-Rubber Articles; and I do hereby declare the following to be a full, clear, and exact description of the same, reference being had to the accompanying drawings, forming a part of this specification, and to the letters of reference marked thereon.

This invention relates more especially to the manufacture of soft-rubber balls, although it will from the following specification be clear to those skilled in the art that it may be applied with equal advantage to the manufacture of other hollow articles of soft rubber or like material, and hence, while I shall confine my description to the process and mechanism employed by me in the manufacture of rubber balls, I do not wish to be limited to this particular manufacture.

In the manufacture of articles of this kind heretofore, it has been customary to form the articles from sheet material or stock, usually soft rubber in a more or less unvulcanized state, but preferably containing the materials for facilitating vulcanization and for giving the rubber a suitable body for the purposes intended. The stock has usually been first cut into proper shape to form a ball or take the desired shape by inflation, in which shape it is vulcanized in the ordinary manner. When balls are being manufactured it is customary to place between the sheets a small quantity of carbonate of ammonia or water, which when heated in the process of vulcanization will form a gas to expand or inflate the article so as to fill the vulcanizing-mold and give a proper set to the stock, as is well understood by those skilled in the art. Such processes have usually been carried out by hand and while machinery has been utilized to some extent the process where machinery was so utilized has been very different and need not be dwelt upon herein further than to say that the articles are made in sections or halves adapted to be united after being formed separately.

The old processes, such as above described, are unsatisfactory because of the fact that it is quite impossible to form the seams between the edges of the sheets uniform in all instances, the result being that in the most economical manufacture approximately ten per cent. of the goods is lost. The defects in the seams can only be seen after vulcanization, by which process the material is greatly reduced in value for manufacturing purposes.

I have in my present invention aimed to materially reduce the cost of production and overcome the objections in the old processes by reducing the number of defective articles and enabling the defects to be seen before the process of vulcanization, when the stock has not been materially injured for manufacturing purposes. The process which I pursue is as follows: I first superpose sheets of stock from which the ball is to be formed, clamp or confine the two sheets together in a circular line, leaving the portion of the stock within the circle of proper size to form a ball of the desired diameter. Then while the sheets are so clamped I inflate the portion within the confined area and while in its inflated condition sever the same from the sheets of stock by a pressure sufficient to cut the stock and unite the edges of the confined portion.

In the condition in which the stock is worked the edges will be united autogeneously by pressure, or, if preferred, a cementing material may be placed between the sheets of stock. In the condition described the article may be handled and transferred to the vulcanizing-mold in the ordinary manner, and should the seam uniting the sheet be defective it will be known by the speedy collapse of the article before vulcanization. The process contemplated by me involves the further step of so supporting the stock during the process of inflation that the walls of the article shall be uniformly stretched or attenuated and the seam between the sheets thickened to give additional strength, which steps will be hereinafter more fully explained in connection with the description of the mechanism which I have designed for carrying my invention into practice.

Referring to the accompanying drawings, Figure 1 is a front elevation of a machine designed for carrying my invention into practice. Fig. 2 is an elevation looking at the left-hand side with portions broken away to illustrate more clearly the parts concealed thereby. Fig. 3 is a similar view looking at the right-hand side of the machine. Fig. 4 is a top plan view of one of the molds or dies. Fig. 5 is a vertical section through the same, and Fig. 6 is a sectional view of a modification. Fig 7 is a sectional view of a ball made by my method. Fig. 8 is a sectional view through the dies when the dams have been brought together and the ball inflated, but before the injector is withdrawn. Fig. 9 is an enlarged view of one side of the dies with the parts in the same position. Fig. 10 is a view similar to Fig. 9, with the injector withdrawn to the position it occupies when pressure is reduced. Fig. 11 is a similar view with the dies brought together and the rubber stock severed. Figs. 12 and 13 are detail elevations showing the mechanism for operating the anvil-locking bolts, Fig. 12 showing the dies and heads opened widely, and Fig. 13 as the dies separate and the inclines in engagement with the cranks to withdraw the bolts and allow the anvils to advance and discharge the balls. Fig. 14 is an elevation of the valve controlling the air-pressure.

Like letters of reference in the several figures indicate the same parts.

The machine illustrated is designed for the formation of a series of balls at each operation; but it will be understood that the number formed at one operation is immaterial.

The letter A indicates the frame of the machine having at the top ways B for a sliding head B' adapted to be moved vertically by means of the connecting-rods $B^2$ extending down on each side and operated by cranks $B^3$ on the ends of a shaft $B^4$ extending transversely of the machine. This shaft is driven intermittingly, as will be presently described, the motion being derived through the train of gears C C' $C^2$ $C^3$, the latter being mounted on a shaft $C^4$ driven by fast and loose pulleys $C^5$.

In the lower face of the sliding head B there is mounted a series of concave molds or dies E, and immediately below them on the cross table or support F is a corresponding series of dies E', said upper and lower dies registering with each other and adapted when the sliding head is brought down to come together with sufficient force to sever the stock located between them.

Around the edges of each of the dies there is located a dam or clamp, the clamps on the upper and lower dies being adapted to come together in advance of the edges of the dies themselves and to yield slightly or to a sufficient degree to allow the edges of the dies to come together. In the preferred construction these clamps take the form of annular collars G sliding directly on the dies and having their clamp-faces held normally projected slightly beyond the edge of the dies by means of relatively heavy springs G', as shown clearly in Fig. 5.

In the operation of the machine it is designed as just stated that the clamps shall come together in advance of the molds, and at the moment when the clamps have gripped the stock firmly I inflate the balls or the portion of the stock held between the clamps by means of injectors, which latter, for convenience, are in the form of relatively fine hollow needles H carried by a tube H' connected through a flexible tube $H^2$ with a source of pressure supply, and adapted, through mechanical connections to be presently described, to be advanced between the superposed sheets of stock and between the lips of the clamps, the latter exerting sufficient pressure to prevent the escape of air, but at the same time allowing the needle or injector to be withdrawn without difficulty. The needles of the injectors preferably enter the clamps at one side of the center or tangentially in order that the hole left thereby may be more readily closed by the pressure of the clamps after the needle is withdrawn.

The source of pressure supply is preferably a receiver formed by the framing of the machine which is all hollow and supplied through a pipe $I^8$ by an air-pump I operated by a crank-arm I' on the shaft c. A safety-valve $I^2$ is provided on the hollow frame to guard against excess of pressure, and a pressure-gage $I^3$ at the top of the frame indicates to the operator the pressure existing at the instant of inflation. To advance the injector-carrying tube H' it is mounted to move in ways $H^2$ at each side of the machine and is connected by a link $H^3$ with a bell-crank $H^4$ operated through a link $H^5$ from a foot-treadle $H^6$.

The process as carried out with the mechanism thus far described is as follows:

A sheet of rubber is laid on the lower dies and the injectors advanced so as to project within the circle of the clamps, a small portion of carbonate of ammonia or water being placed within the circle and another sheet of rubber laid over the top of the injectors. The sliding head is then caused to descend until the two clamps are pressed together with sufficient force to prevent the escape of air from within the clamps, when pressure is admitted through the injectors, preferably by the manipulation of a valve W at one end of the injector-support. This forces the portions of the sheets of rubber confined by the clamps in opposite directions and fills the dies, giving the portions confined within the clamps a somewhat spherical shape. When this has been done, the injectors are withdrawn beyond the edge of the clamps and the motion of the sliding head is completed, the pressure on the clamps increased, and the edges of the dies or molds brought together. The clamps prevent any of the material from flowing outward, and in fact as they come together they force a portion of the material or stock inward and consequently as none of the material can flow outward when the edges of the dies approach, it is of necessity caused to flow inward and unites autogeneously in the form of a relatively thick seam, the projection of which is on the inside of the completed article, as shown clearly at S, Fig. 7. The dies are brought together with sufficient force to sever the two sheets of stock, and when the dies are again separated the articles may be removed and replaced in the ordinary molds for vulcanization.

It is found in practical operation that the sheets of rubber or stock when inflated within the clamps and dies will expand more at the center or polar portions, considering the point of union as the equator, the result being that these portions of the article are made much thinner, and when inflated after vulcanization will cause the article to assume an ovoid shape. To prevent this and secure a perfectly equal attenuation or stretching of the stock throughout the whole area, I provide a means for supporting that portion of the stock constituting the polar portions, while the zones nearer the center or line of union are expanded. By reference to Figs. 5, 9, 10, and 11 it will be seen that each die is provided with a central anvil K, preferably movable and held advanced by a spring K' to the position shown in dotted lines.

When pressure is admitted between the sheets of material, it causes the portions of the material between the edges of the anvil and edges of the die to be first expanded. Then, as the pressure increases or the portions mentioned have become expanded sufficiently, the anvils will be forced back and the polar portions will be expanded, the anvil retreating and forming the bottom portions of the dies. The anvils are prevented from advancing and again compressing the articles when the pressure is relieved by bolts $k$ working through the sides of the dies and adapted to engage a shoulder $k'$ in the body of the anvil when the latter are retracted. These bolts are adapted to be released by being connected with cranks $k^2$ on shafts $k^3$ having operating-cranks $k^4$, Figs. 2, 3, 12, and 13, with which inclines $k^5 k^6$ on the frame and sliding head respectively engage. These inclines engage the releasing-cranks $k^4$ as the sliding head moves upward and after it is sufficiently separated to allow the articles to be removed, the result being that the anvils are held retracted during the time the articles are being completed, but are advanced to disengage the finished article and are ready for the formation of other articles as soon as the dies are separated.

It has been further developed in the practical operation of the machine and in the practice of the method set forth that if a sufficient pressure is admitted between the sheets held by the clamps to force the same outward and give a proper attenuation of the walls and this pressure is maintained until the dies are opened, it is apt to cause such an expansion as would either distort or endanger the article by opening or weakening the seams or else cause it to more than fill the vulcanizing-mold or fill the same irregularly, and with a view to overcoming this I first admit sufficient pressure to properly expand the article and then reduce the pressure, leaving only sufficient pressure to give the articles an approximately spherical shape, relying on the usual ammonia or equivalent to give the necessary expansion or inflation during vulcanization. For this purpose the valve controlling the admission of pressure to the injectors is made in the form of a pressure-reducing valve, and in operation, after pressure has been admitted to the injectors a reverse motion of the valve cuts off the pressure supply and opens the injectors to the atmosphere through the pressure-reducing valve, which being set at the proper point will allow the pressure in the several articles to instantly drop, the air flowing back through the injectors.

The movements of the injectors may be controlled so as to prevent any possibility of their being caught by the edges of the dies or clamps through automatic mechanism, which will, after pressure is admitted, first withdraw the injectors just beyond the edges of the clamps, without, however, withdrawing them from the opening formed by them between the sheets of rubber, so as to prevent the pressure from escaping until the clamps and edges of the dies are brought together. For this purpose the injectors are preferably retracted by spring-pressure, a spring L being provided at one end for this purpose, and a pawl L', co-operating with notches $l$ on a segment $L^2$, serves to hold the injectors advanced. The notches $l$ are so positioned that one of them will co-operate with the pawl when the injectors are fully advanced, the second when the injectors are withdrawn just beyond the edge of the clamps, and the third when the injectors are fully withdrawn. The pawl is released by pins $L^3$ carried by a gear-wheel $L^4$ journaled on the frame and driven by a pinion $L^5$ on the shaft $c$ of the main train. The pins $L^3 L^3$ are so positioned that as the wheel $L^4$ is rotated one will engage the pawl at the proper instant to allow the injectors to retreat to the proper point (shown in Fig. 10) just before the final manipulation of the pressure-valve, and when this has been done and the clamps brought together the second will engage the pawl and allow the injectors to fully retreat out of the way of the manipulation of the stock.

By reference to Figs. 3 and 14 it will be seen that the valve is automatically operated to cut off the pressure and open communication, through the pressure-regulator, with the external air. The valve W is made in the form of a three-way cock controlled by the arm $W^6$ adapted to be elevated by spring-pressure and depressed by a foot $W^5$ carried by the upper head. When the upper head descends to the position shown in Fig. 9, the foot and valve occupy the position shown in full lines, Fig. 14, with air-pressure from the reservoir open to the needles, and when the needles are retracted to the position shown in Fig. 10, the valve being on the needle-carrying bar, moves back to the position shown in dotted lines, Fig. 14, the arm W⁶ slips off the foot W⁵ and the valve is shifted to cut off the pressure and open the needles to the external air through the pressure-regulating valve W⁴. This latter is of any ordinary construction and needs no special description.

Figure 15:
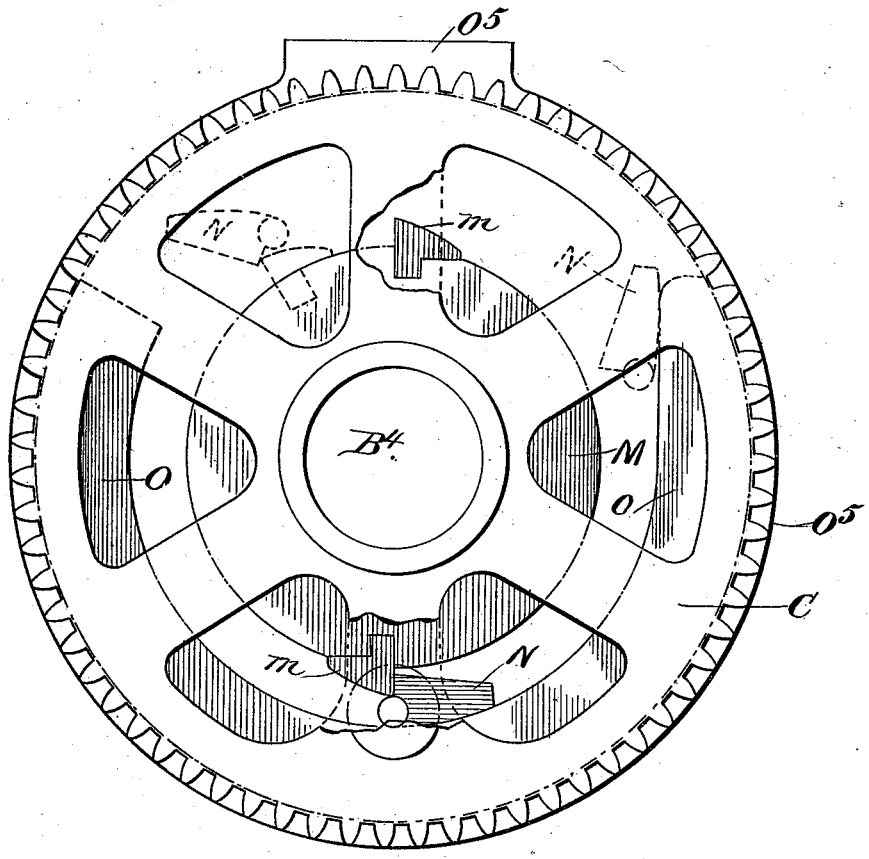

As before intimated, it is preferable to have the sliding head operated intermittingly and if reference be had to Figs. 2, 3, and 15 it will be seen that on the shaft B⁴, I mount rigidly a disk M having teeth $m$ and the gear-wheel C is provided on one of its spokes with a pawl N adapted to engage with said teeth $m$ locking the gear-wheel and shaft for simultaneous rotation. This pawl is held in engagement with the teeth only during a portion of each revolution of the gear-wheel, and consequently operates the sliding head during only a portion of such movement. The mechanism for holding the pawl in engagement consists of a curved guide O adjustably mounted on a circular or rim-like portion O⁵ of the frame through the medium of slots and bolts $o$ and preferably extends somewhat more than half-way around the shaft, the end of the pawl-rods inside of this curved guide O, as shown in Fig. 15, (dotted lines on the left,) being thereby held in engagement with the disk, but when the pawl has advanced beyond the guide it yields or turns back and releases the disk. The pawl remains out of operation until its rear end strikes the rounded end of the curved guide, as shown in dotted lines on the right in Fig. 15, when it is again moved into operative position and will engage the lower tooth.

The unlocking or releasing of the crank-shaft and main gear takes place twice during one movement of the sliding head. The lower intermission takes place the instant the clamps first bite on the rubber. The time of intermission is sufficient to inflate the ball and subsequently to allow the surplus air to escape by the valve. The upper intermission takes place when the head is near the extreme upper limit of its motion and affords the operator time to remove the balls, strip off the surplus rubber remaining on the clamps and place fresh sheets in position upon the clamps for subsequent operation.

Obviously the speed of the machine determines the length of the intermission, but it is to be noted that no intermission is necessary if the machine is to be run slowly, and furthermore, if so desired, any of the ordinary mechanical expedients for reducing the motion periodically may be employed or the whole mechanism may be stopped periodically and again thrown into operation manually by any of the ordinary well-known means.

The particular form of dam or clamp for preventing the outward flow of the stock may be varied, if so desired, and in fact elastic clamps, such as rubber rings P, Fig. 6, might be employed to good advantage.

To secure a stronger seam I may bevel the edges of the dies, as in Figs. 9, 10, and 11, or said edges may have annular concavities, such as Q, Fig. 6, which serve to grip portions of the respective sheets between them and subject the same to excessive pressure, thereby securing a perfect welding or autogeneous union of the edges on the outer side, which in connection with the thickening and flowing together of the material at the junction makes it even more certain that a perfect seam shall be secured.

Obviously where balls or other articles are to be manufactured for inflation after vulcanization, the sections of stock placed within the dies are provided with soft-rubber valves or equivalent devices and the balls or articles formed in the ordinary manner. So, too, it will be understood that while I have described my invention as applied in the manufacture of rubber balls it will be found especially advantageous in the manufacture of irregularly-shaped articles, such as dolls and the like.

The seam in the finished and vulcanized ball has the edges upset or thickened on the inside, as shown clearly in Fig. 7, and hence the chances of separating or tearing apart at this point is reduced to the minimum.

The form of the seam leaves no rough or free edges on the inside of the ball as in the lap-joint constructions, nor does it have the inherent weakness of the plain seam with abutted edges.

Having thus described my invention, what I claim as new is—

1. The herein described art of manufacturing hollow articles of elastic material, consisting in superposing sheets of stock or material from which the article is to be formed, confining the sheets together along the line they are to be united, separating the sheets in the confined area to set or form the stock and finally uniting the sheets along the edge of the confined area; substantially as described.

2. The herein described art of forming hollow articles of elastic material, consisting in superposing sheets of material from which the article is to be formed, confining the sheets together along the line they are to be united, inflating the confined area and finally while so inflated uniting the sheets along the edge of the confined area; substantially as described.

3. The herein described art of manufacturing hollow articles of elastic material, consisting in forming the article ready for inflation, then inflating it and simultaneously supporting those portions subjected to the greatest tension whereby a uniform expansion or attenuation of the material is secured; substantially as described.

4. The herein described art of manufacturing hollow articles of elastic material, consisting in forming the article ready for inflation, then inflating it and simultaneously supporting with a yielding pressure those portions subjected to the greatest tension, whereby a uniform expansion or attenuation of the material is secured; substantially as described.

5. The herein described art of manufacturing hollow articles of elastic material, consisting in superposing sheets of the material from which the article is to be formed, clamping the sheets together on a line approximating the shape of the article and finally uniting the sheets autogeneously and severing the same from the surrounding material by pressure applied within the clamped area, whereby the material displaced is forced inward to form a seam with thickened or upset edges on the inner side; substantially as described.

6. The herein described art of manufacturing hollow articles of elastic material consisting in superposing sheets of the material from which the article is to be formed confining the sheets together along the line they are to be united, inflating the confined area and simultaneously supporting those portions subjected to greatest tension to secure a uniform attenuation, and finally severing the sheets while inflated by pressure applied within the confined area whereby the material displaced is caused to flow inward and form upset or thickened seams; substantially as described.

7. In a machine for making hollow articles of elastic material, the combination with the cooperating concave dies having cooperating severing edges for severing the material held between them and clamping dams surrounding the edges of said dies and having cooperating clamping edges for clamping the material, of inflating injectors movable toward and from the dies; substantially as described.

8. In a machine for making hollow articles of elastic material, the combination with the cooperating concave dies, of the clamping dams surrounding said dies, movable with relation thereto and normally standing in advance of the edges of the dies, whereby the clamps may remain stationary while the dies advance, and means for inflating the article held by the dams; substantially as described.

9. In a machine for making hollow articles of elastic material, the combination with the concave die and cooperating die, of an anvil arranged centrally of the concave die for supporting the portion of the material subjected to the greatest tension with means for inflating the article held by the dies; substantially as described.

10. In a machine for making hollow articles of elastic material, the combination with the cooperating concave dies, and means for inflating the article therein, of independent anvils arranged centrally of the dies for supporting the portions of the material subjected to the greatest tension while being inflated; substantially as described.

11. In a machine for making hollow articles of elastic material, the combination with the cooperating concave dies, of yielding anvils located centrally thereof for supporting the portion of the material subjected to the greatest tension and a means for inflating the article within the dies; substantially as described.

12. In a machine for making hollow articles of elastic material, the combination with the cooperating concave dies and the yielding clamps surrounding the dies, of the supporting anvils arranged centrally of the dies and a means for inflating the article within the dies; substantially as described.

13. In a machine for making hollow articles of elastic material the combination with the cooperating concave dies and the yielding clamps surrounding the dies, of the yielding supporting anvils centrally located in the dies and a means for inflating the article within the dies; substantially as described.

14. In a machine for making hollow articles of elastic material the combination with the cooperating concave dies of the movable anvils forming the bottom of the dies and locks for said anvils; substantially as described.

15. In a machine for making hollow articles of elastic material the combination with the cooperating concave dies, of the spring pressed anvils forming the bottom of the dies and the locks for holding the anvils retracted; substantially as described.

16. In a machine for making hollow articles of elastic material, the combination with the dies movable toward and from each other, of the injector for inflating the article movable toward and from the dies; substantially as described.

17. In a machine for making hollow articles of elastic material, the combination with the dies movable toward and from each other and the yielding clamps surrounding the dies, of the injector for inflating the article adapted to rest between the faces of the clamps; substantially as described.

18. In a machine for making hollow articles of elastic material, the combination with the cooperating dies and injector for inflating the article in the dies, of a valve for allowing the pressure from the article to escape whereby the pressure may be reduced; substantially as described.

19. In a machine for making hollow articles of elastic material, the combination with the cooperating dies and injector for inflating the article in the dies, of a pressure reducing valve connected with the injector, whereby the pressure in the article may be reduced before its release from the dies; substantially as described.

20. In a machine for making hollow articles of elastic material, the combination with the cooperating dies, mechanism for moving said dies toward and from each other and spring pressed anvils in the dies, of bolts for holding said anvils retracted when the dies are together, with means whereby the bolts are released automatically by the separation of the dies, to permit the anvils to advance; substantially as described.

21. In a machine for making hollow articles of elastic material, the combination with the dies movable toward and from each other and the spring pressed anvils within said dies, of the bolts for holding said anvils retracted and the inclines for withdrawing said bolts as the dies separate to allow the anvils to advance; substantially as described.

22. In a machine for making hollow articles of elastic material, the combination with the dies movable toward and from each other, of the injector, a manually operated treadle controlling said injector and a stop for arresting the backward movement of said injector at an intermediate point; substantially as described.

23. In a machine for making hollow articles, the combination with the driving mechanism and dies movable toward and from each other, of the injector a spring for retracting, and a manually operated treadle for controlling the advance of the injector, and stops released by the driving mechanism for holding the injector advanced; substantially as described.

24. In a machine for making hollow articles from soft rubber, the combination with the stationary dies having the clamps surrounding the same, of the movable dies having the clamps surrounding them, the sliding head carrying the movable dies, the crank shaft for reciprocating the sliding head, the driving gear and the intermittingly operating clutch between the driving gear and shaft; substantially as described.

25. In a machine for making hollow articles from soft rubber, the combination with the stationary and movable dies and the sliding head carrying the movable dies, of the crank shaft for reciprocating the sliding head, the toothed disk thereon, the driving gear the pawl thereon adapted to engage the toothed disk and the fixed guide for throwing the pawl into engagement; substantially as described.

HENRY G. WOLCOTT.

Witnesses:
WARREN HINCHCLIFFE,
J. E. LODGE.